Fig. I

INVENTOR.
By John J. O'Connell
Edwin S. Dybvig
His Attorney

Nov. 22, 1960   J. J. O'CONNELL   2,960,849
REFRIGERATING APPARATUS
Filed April 6, 1959   3 Sheets-Sheet 2

INVENTOR.
John J. O'Connell
BY Edwin S. Dybvig
His Attorney

Nov. 22, 1960   J. J. O'CONNELL   2,960,849
REFRIGERATING APPARATUS
Filed April 6, 1959   3 Sheets-Sheet 3

INVENTOR.
John J. O'Connell
BY Edwin S. Dybvig
His Attorney

United States Patent Office 2,960,849
Patented Nov. 22, 1960

2,960,849
REFRIGERATING APPARATUS

John J. O'Connell, Dayton, Ohio, assignor to General Motors Corporation, Detroit, Mich., a corporation of Delaware Filed Apr. 6, 1959, Ser. No. 804,176

9 Claims. (Cl. 62—407)

This invention relates to refrigerating apparatus and especially to the cooling of meat in household refrigerators.

For long storage, it is desirable to keep meat in the freezing compartment of a household refrigerator. However, the freezing of meat does have some adverse effects, often imparting a slight change in taste which is not always liked. Also, it is considered desirable to gradually thaw frozen meat before use. Therefore, it has been customary to provide a container for meat in the above freezing compartment. The temperature of 35° to 50° F. normally maintained in the above freezing compartment is too high for good meat preservation.

It is therefore an object of this invention to provide an arrangement in the above freezing compartment for the storage of meat at the ideal temperature of 30° F. without adversely affecting the storage of other foods in the above freezing compartment.

It is another object of this invention to provide an arrangement in the above freezing compartment for the storage of meat at the ideal temperature of 30° F. and the provision of means for maintaining at that temperature an ideal amount of humidity and air circulation for meat storage without adversely affecting the storage of other foods in the above freezing compartment.

It is another object of this invention to provide a limited cold air circulation above and in thermal exchange with the meat container and to provide a more limited adjustable cold air circulation through the meat container in the above freezing compartment.

These and other objects are attained in the form shown in the drawings in which the forced circulation of cooled air in the above freezing compartment is used to provide a forced circulation of cold air directly over the top of the meat container. In addition, a limited adjustable circulation of this cool air is provided through the meat container for maintaining proper humidity conditions therein. This serves to keep the meat at an ideal temperature of about 30° F. and ideal humidity conditions for best above freezing meat preservation.

Further objects and advantages of the present invention will be apparent from the following description, reference being had to the accompanying drawings wherein a preferred embodiment of the present invention is clearly shown.

Figure 1:
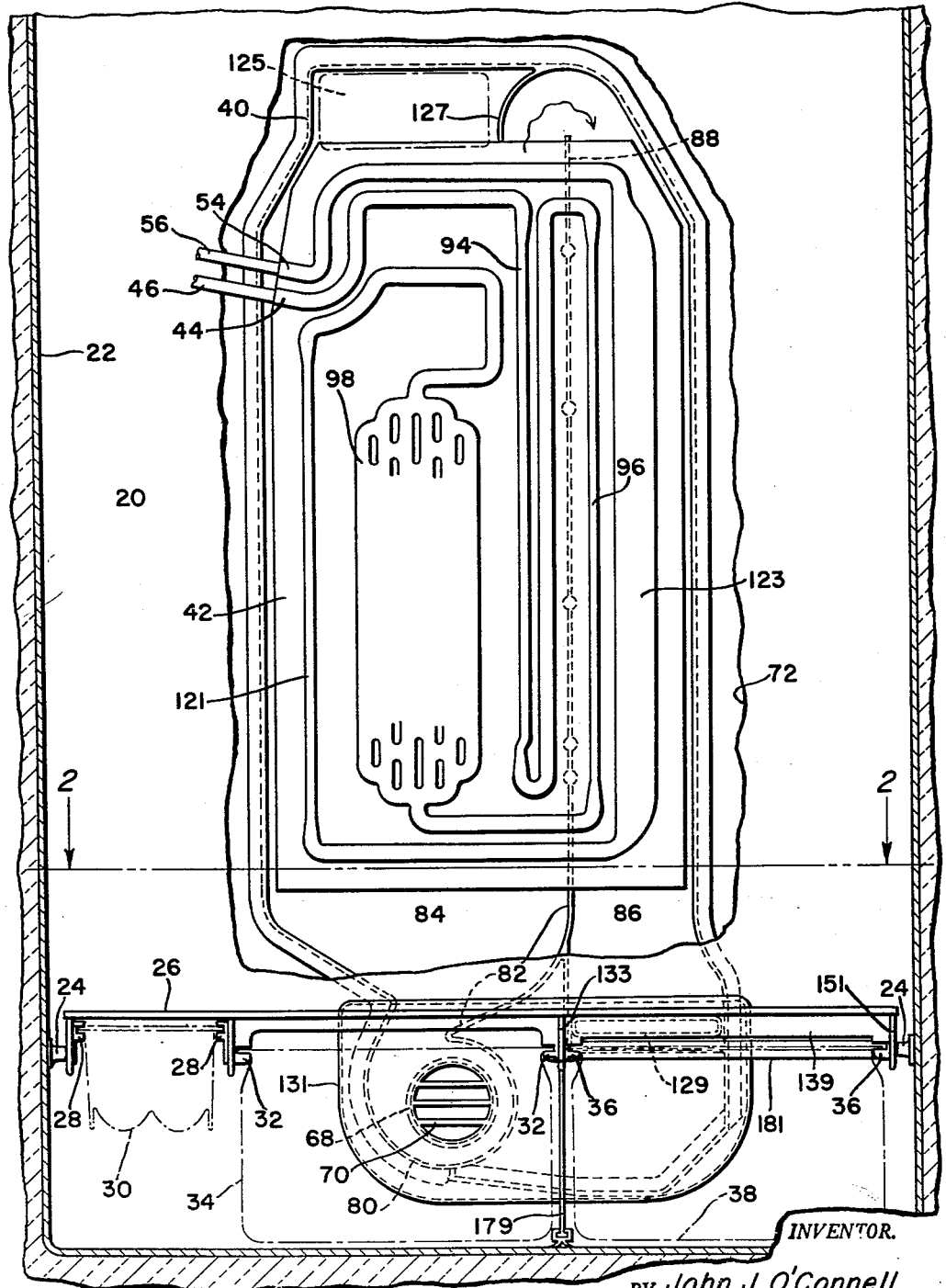
Figure 1 is a front view partly in section with the containers shown in dot-dash outline and the plate 141 omitted of the above freezing compartment of a household refrigerator embodying one form of my invention.

Referring now more particularly to Figure 1, there is shown the above freezing compartment 20 of a household refrigerator enclosed in lined insulated walls 22. Supported upon the pegs 24 extending from the side walls 22 is a shelf 26 of a suitable thermoplastic resin providing guideways 28 for slidably supporting the drawer type egg container 30, guideways 32 for slidably supporting a drawer type high humidity vegetable container 34 and guideways 36 for slidably supporting the drawer type meat container 38. The contents of the vegetable container 34 will be damaged if they freeze, consequently, the temperature of this container must be kept safely above 32° F. at all times. The egg container 30 must be kept from freezing, but the cooling requirements thereof are not so critical.

Figure 4:
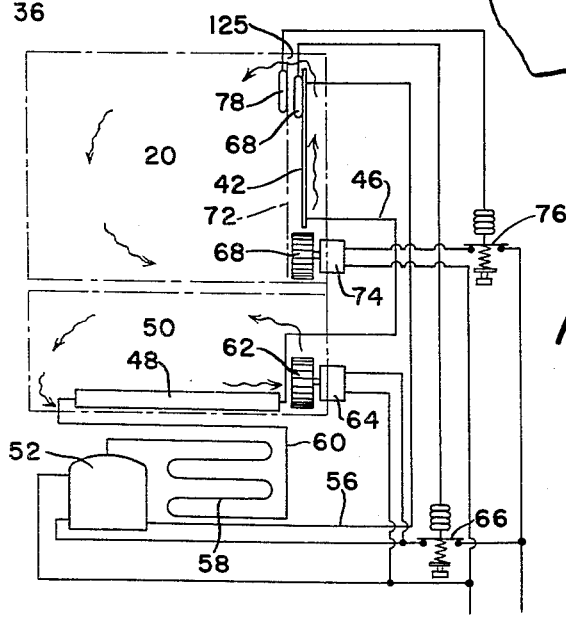
Figure 4 is a diagrammatic view showing the refrigerating system and the air circulation and control systems.
Figure 5:
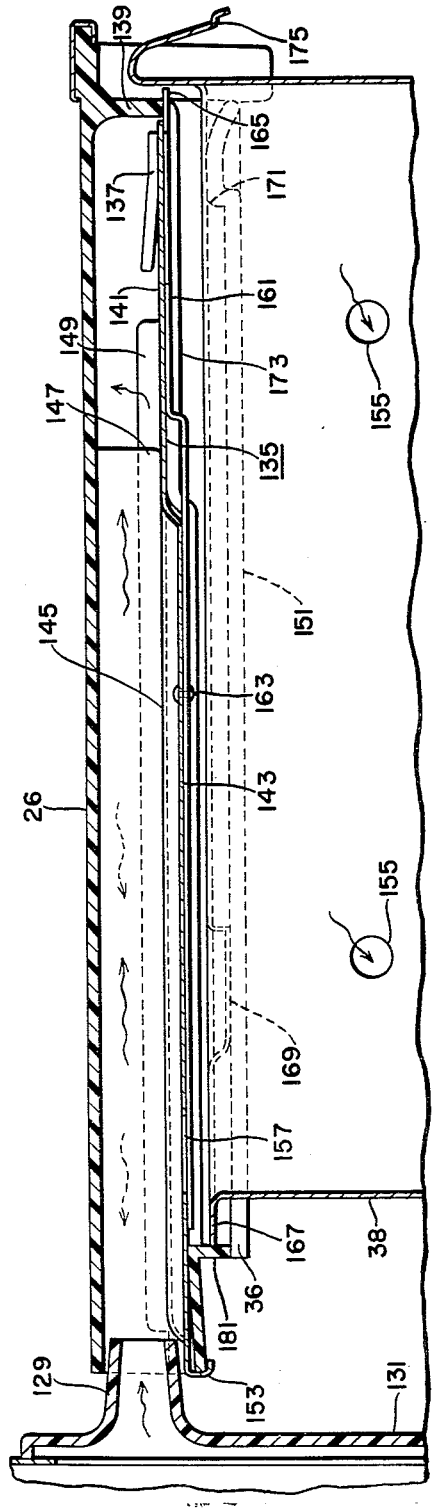
Figure 5 is a fragmentary vertical sectional view taken along the line 5—5 of Figure 2.

To provide for the general cooling of this above freezing compartment 20, there is provided a cavity 40 in the rear wall which is bounded by a shallow vertical pan of a thermoplastic resin or a suitable sheet metal. Lodged within this pan 40 is a vertical sheet metal refrigerant plate evaporator 42 having its inlet 44 connected by the conduit 46 (see Figure 4) to the outlet of the freezing evaporator 48 located beneath the false bottom of the below freezing compartment 50 as shown in Figure 4. This below freezing evaporator 48 is supplied with liquid refrigerant from the sealed motor-compressor unit 52 which withdraws evaporated refrigerant from the outlet 54 of the plate evaporator 42 through the suction conduit 56 and forces this refrigerant into the condenser 58 and conducts the liquefied refrigerant through a capillary restrictor supply conduit 60 to the entrance of the freezing evaporator 48. Any surplus of liquid refrigerant from the evaporator 48 is conducted through an accumulator (not shown) and then through the conduit 44 to the evaporator 42.

A fan 62 driven by an electric motor 64 draws air from the compartment 50 through the evaporator 48 and returns this air to the compartment 50. This fan is connected directly in parallel with the sealed motor-compressor unit 52 and cycles with it according to the operation of the adjustable thermostatic control switch 66 which operates upon a defrosting cycle of about 36°, —5° F. in accordance with the temperatures of the thermostat bulb 68 mounted adjacent the top of the evaporator 42.

A fan 68 is located behind the vegetable container 34 and also behind a grille 70 upon the back wall 72 of the above freezing compartment 20. It is driven by an electric motor 74 under the control of the adjustable thermostatic switch 76 controlled in accordance with the temperature of a thermostat bulb 78 located in the air flow circulating through the above freezing compartment 20. The duct 40 is provided with a lower scroll portion 80 surrounding the fan 68. In addition, the duct is provided with an upper scroll and air discharge dividing wall 82 which separates the discharge of the fan 68 into an upwardly extending column 84 and a downwardly extending column 86. This includes a vertical projecting partition 88 extending forwardly from the rear wall of the duct 40 into engagement with the evaporator 42 and a strip 90 extending between the evaporator 42 and the false portion 92 of the rear wall 72.

The evaporator 42 includes an initial downwardly extending restricted conduit portion 94 connecting with an initial upwardly extending portion extending to the upper portion of the evaporator, all located on the left side of the partition portions 88 and 90. This connects with a downwardly extending restricted portion 96 on the opposite side of the partition portions 88 and 90 connecting at the bottom with a passage extending to a large parallel pass upwardly extending section 98 on the left side of the partition members 88 and 90. The top of this parallel section 98 connects with the top of a restricted passage portion 121 connecting at the bottom with an enlarged upwardly extending accumulator chamber 123 to the right of the partition members 88 and 90 connecting at the top with the outlet 54.

The air is discharged upwardly from the fan 68 on the left side of the partitions 82, 88 and 90 and passes over both sides of the evaporator 42 to be cooled a predetermined amount. An air outlet 125 is provided at the top of the evaporator 42 for discharging moderately cooled air after it has been cooled by the left side of the evaporator 42. This constitutes the largest portion of the air circulated by the fan 68. A minor portion of the air is directed by the curved partition wall 127 above the evaporator 42 and reverses the direction of the air into a downward flow so that it passes downwardly through the right passageway 86 to the right of the partition walls 88 and 90 to again pass into heat transfer relation with the evaporator 42. During this portion of the circulation, however, this air passes over the right side of the evaporator 42 containing the passages 96 and 123 extending through the right passageway 86.

The cooled air from the bottom of the right passageway 86 is discharged from a wide flat nozzle 129 formed in the removable plastic resin front 131 covering the opening in the back wall 72 provided for the access to the fan 68 and its motor 74 as well as the remainder of the space within the duct 40 behind and below the shelf 26 as shown in Figure 1. The nozzle 129 is located immediately to the right of the left guideway 36 supported by the downwardly extending partition 133 extending downwardly from the shelf 26. An air circulating duct is provided beneath the shelf 26 above the meat container 38 by a thin sheet metal member 135 supported on top of the guideways 36. It is inserted into the shelf 26 from the rear, and its front edge fits in between the guide members 137 adjacent the front of the shelf 26 and the guide members 36 to hold the front edge in contact with the downwardly extending projection 139. This sheet metal member 135 is provided with a forward raised portion 141 and two lower rear portions 143 separated by a central rib 145 extending into contact with the bottom of a downwardly extending dividing rib 147. The sides of this metal member 135 are provided with upturned stiffening flanges 149 fitting against the partition 133 and the edge portion 151 of the shelf 26 to keep the enclosure of the duct beneath the shelf 26 and above the pan 48. The rear edge of the metal partition 135 is provided with a rolled flange 153.

The outlet nozzle discharges the doubly cooled air at 18° to 24° F. from the rear forwardly above the rear cross strip 181 through the passage on the left side of the partition wall 147, and the air flows forwardly until it reaches the down-turned projection 139 causing it to reverse its direction and flow rearwardly on the right side of the partition wall 147 between the metal partition 135 and the 26. This air escapes through the outlet provided above the rear cross strip 181 at the rear of the shelf 26 upon the right side of the partition wall 147. This air flows laterally, upwardly, downwardly around the outside of the meat container 38. The meat container 38 is cooled by natural convection inside the meat tender as a result of the cold air flowing above the metal partition 135 and also by the air after its discharge from the duct beneath the shelf, since this air flows around it. This keeps the meat container 38 and its contents between the temperatures of about 28° F. and 32° F. for good meat preservation. Since this temperature, 28° F. to 32° F., is colder than other temperatures in the above freezing compartment, moisture is attracted to the meat container 38.

Figure 2:
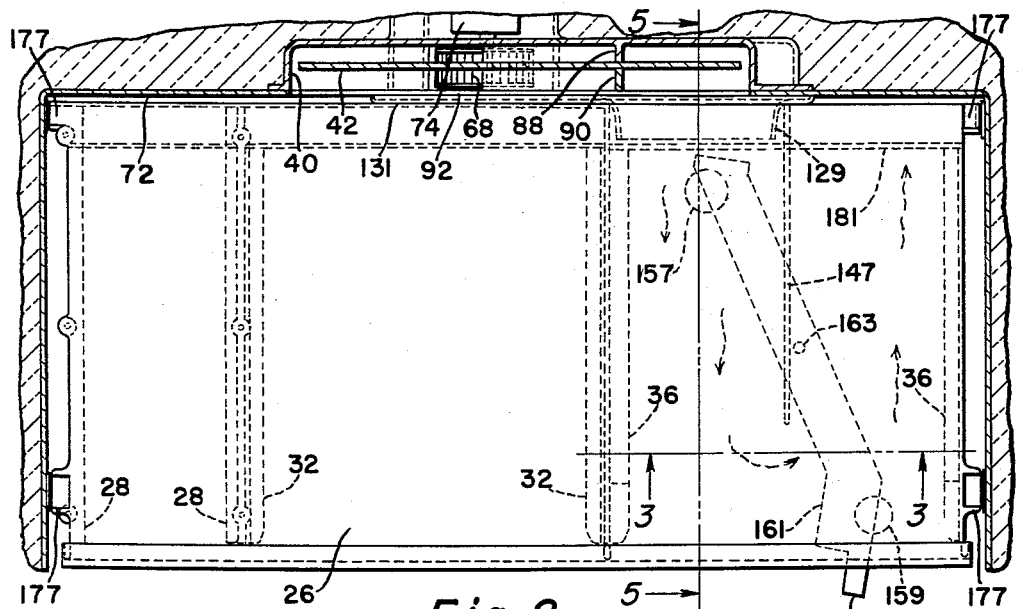
Figure 2 is a horizontal sectional view taken substantially along the line 2—2 of Figure 1.
Figure 3:
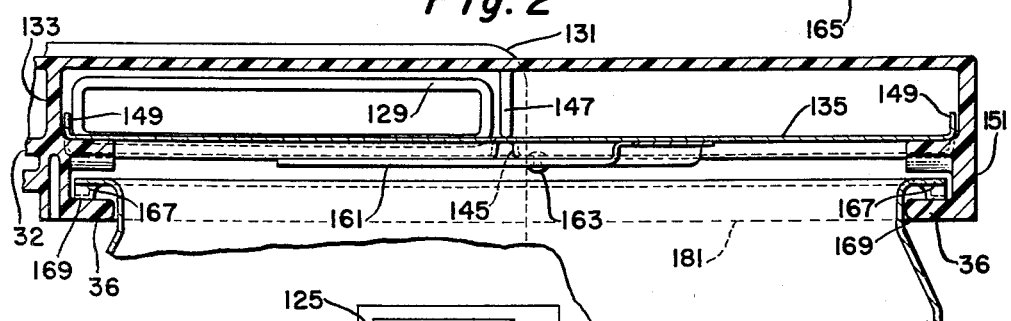
Figure 3 is a fragmentary vertical sectional view taken along the line 3—3 of Figure 2.

To control the humidity within the meat container 38, the vertical side walls thereof are provided with two ventilating openings 155. In addition, the metal partition 135 is provided with a small aperture 157 at the left rear and a second small aperture 159 at the right front. These two apertures provide additional ventilation derived from the air discharged from the outlet nozzle 129. The flow of air through these openings 157 and 159 into the container 38 is controlled by a simple valve 161 formed of a strip of metal of the configuration shown in Figures 2 and 3 pivoted upon the rivet 163 to the metal partition 135. The front edge of this valve 161 is provided with a small projection 165 serving as a handle so that it may be pivoted to either close both of the openings 157 and 159 or to partially or fully open these openings for maximum ventilation. When these openings 157 and 159 are open, the cold dry air will flow through them and through the interior of the container 38 and out through the openings 155 in the upright side walls of the container 38 which prevents excess moisture under high humidity conditions.

The nozzle outlet 129 fits into the entrance of the duct arrangement between the shelf 26 and the metal partition 135 so that leakage is minimized. The container 38 is supported by its out-turned flanges 167 upon the guide rails 36. A portion of each side flange is provided with a down-turned projection 169 adapted to engage the hump 171 provided at the front end of the guide rails 38. This hump 171 also prevents accidental complete withdrawal of the container 38. The meat tender container 38, however, can be completely withdrawn by raising the projection 169 over the hump 171 for this purpose. The flange 167 and the hump 169 on the meat tender 38 prevents inserting the meat tender 38 into the guide rails 32 since the guide rails 32 are spaced too closely to admit the hump 169. The upper front portion 173 of each of the rails 36 is raised so that this can be accomplished. The front flange of the container 38 is curled downwardly to provide a handle 175. The shelf 26 is provided with four side projections 177 extending over and resting upon the pegs 24. These projections enable the shelf 26 to be readily removed and withdrawn from the nozzle outlet 129. The metal partition 135 may then be readily removed so that the shelf 26 and the ductwork may be readily cleaned. The container 38 is also removable for cleaning.

There is also a plastic partition 179 extending full depth and height between the container 34 and meat tender 38 and sealed to the bottom of the food liner 22. This prevents direct flow of cold air against the container 34 and forces the cold air to flow up into contact with any shelves or compartments which may be provided upon the above freezing compartment door.

While the embodiment of the present invention as herein disclosed, constitutes a preferred form, it is to be understood that other forms might be adopted.

What is claimed is as follows:

1. A refrigerator including insulated walls enclosing a food compartment to be cooled, a removable container within said compartment adapted to contain food having especial requirements for good preservation, an evaporator for cooling said food compartment, means for circulating air into heat transfer relationship with said evaporator, a removable top cover for said container provided with an air duct having a metal wall forming its bottom and separating it from the interior of said container, and means for dividing and conducting air from said circulating means after it has been cooled by said evaporator to discharge a portion into said compartment to be cooled and to circulate a second portion through said air duct in said top cover to cool said container.

2. A refrigerator including insulated walls enclosing a food compartment to be cooled, a container within said compartment adapted to contain food having especial requirements for good preservation, an evaporator for cooling said food compartment, means for circulating air into heat transfer relationship with said evaporator and dividing said air, means for discharging one portion of said divided air into said compartment to be cooled, means for circulating another portion of said divided air into heat transfer relation with said container, and means for controlling the flow of said another portion of said divided air into the interior of said container.

3. A refrigerator including insulated walls enclosing a food compartment to be cooled, an evaporator, means including a fan and a duct for drawing air from said compartment and circulating the air in heat transfer relation with said evaporator, said duct being provided with a first outlet, a container within said compartment adapted to contain food having especial requirements for good preservation, a removable support for said container, said support containing a second air duct having an inlet fitting connecting with said first outlet and extending therefrom into heat transfer relation with said container.

4. A refrigerator including insulated walls enclosing a food compartment to be cooled, an evaporator, means including a fan and a duct for drawing air from said compartment and circulating the air in heat transfer relation with said evaporator, said duct being provided with a first outlet, a removable shelf supported within said compartment provided with a second duct having an inlet fitting removably connected to said first outlet, a container within said food compartment removably supported beneath said shelf, said second duct extending over said container for removing heat from said container.

5. A refrigerator including insulated walls enclosing a food compartment to be cooled, an evaporator, means including a fan and a duct for drawing air from said compartment and circulating the air in heat transfer relation with said evaporator, said duct being provided with a first outlet, a removable shelf supported within said compartment provided with a second duct having an inlet fitting removably connected to said first outlet, a container with said food compartment removably supported beneath said shelf, said second duct extending over said container for removing heat from said container, said second duct having a lower metal wall between it and the interior of the container.

6. A refrigerator including insulated walls enclosing a food compartment to be cooled, an evaporator, means including a fan and a duct for drawing air from said comaprtment and circulating the air in heat transfer relation with said evaporator, said duct being provided with a first outlet, a removable shelf supported within said compartment provided with a second duct having an inlet fitting removably connected to said first outlet, a container within said food compartment removably supported beneath said shelf, said second duct having a removable metal bottom wall extending over said container for removing heat from said container.

7. A refrigerator including rear and side and top and bottom insulated walls enclosing a food compartment to be cooled, an insulated door opposite said rear wall for access to said compartment, a first duct located in said rear wall having an outlet, an evaporator located in said first duct, a fan for drawing air from said compartment and circulating the air through said first duct to said outlet, a removable shelf supported in said compartment having its rear edge substantially abutting said outlet, one side of said shelf being provided with a wide flat duct lying generally in a horizontal plane with an inlet near the middle of said shelf connecting with said outlet and having an outlet at the rear adjacent one side, and a removable container mounted upon and beneath said shelf and beneath said wide flat duct and having its interior in heat transfer relation with said wide flat duct.

8. A refrigerator including rear and side and top and bottom insulated walls enclosing a food compartment to be cooled, an insulated door opposite said rear wall for access to said compartment, a first duct located in said rear wall having an outlet, an evaporator located in said first duct, a fan for drawing air from said compartment and circulating the air through said first duct to said outlet, a removable shelf supported in said compartment having its rear edge substantially abutting said outlet, one side of said shelf being provided with a wide flat duct lying generally in a horizontal plane with an inlet near the middle of said shelf connecting with said outlet and having an outlet at the rear adjacent one side, a removable container mounted upon and beneath said shelf and beneath said wide flat duct and having its interior in heat transfer relation with said wide flat duct, a second container mounted beneath said shelf on the side opposite said wide flat duct, said first duct having an inlet in said rear wall behind said second container.

9. A refrigerator including rear and side and top and bottom insulated walls enclosing a food compartment to be cooled, an insulated door opposite said rear wall for access to said compartment, a first duct located in said rear wall having two outlets, an evaporator located in said first duct, a fan for drawing air from said compartment and circulating the air through said first duct to said outlets, a removable shelf supported in said compartment having its rear edge substantially abutting one of said outlets, one side of said shelf being provided with a wide flat duct lying generally in a horizontal plane with an inlet near the middle of said shelf connecting with said one outlet and having an outlet at the rear adjacent one side, and a removable container mounted upon and beneath said shelf and beneath said wide flat duct and having its interior in heat transfer relation with said wide flat duct, a second container mounted beneath said shelf on the side opposite said wide flat duct, said first duct having an inlet in said rear wall behind said second container, said inlet to said first duct and said one outlet and said containers and said shelf being located in the lower portion of said compartment and the second outlet of said first duct being located in the upper portion of said compartment.

References Cited in the file of this patent

UNITED STATES PATENTS

| | | |
|---|---|---|
| 1,830,044 | Vandoren | Nov. 3, 1931 |
| 2,255,503 | Carbary | Sept. 9, 1941 |
| 2,382,084 | Mathews | Aug. 14, 1945 |
| 2,532,816 | Kurtz | Dec. 5, 1950 |
| 2,709,900 | Zearfoss | June 7, 1955 |
| 2,826,046 | Tobiasz | Mar. 11, 1958 |
| 2,836,039 | Weber | May 27, 1958 |

Notice of Adverse Decision in Interference

In Interference No. 92,459 involving Patent No. 2,960,849, J. J. O'Connell, Refrigerating apparatus, final decision adverse to the patentee was rendered Aug. 13, 1963, as to claim 3.

[*Official Gazette November 12, 1963.*]